(12) United States Patent
Rinne

(10) Patent No.: US 7,873,075 B2
(45) Date of Patent: *Jan. 18, 2011

(54) DATA SEGMENTATION METHOD IN A TELECOMMUNICATIONS SYSTEM

(75) Inventor: Mikko Rinne, Helsinki (FI)

(73) Assignee: Nokia Corporation, Espoo (FI)

( * ) Notice: Subject to any disclaimer, the term of this patent is extended or adjusted under 35 U.S.C. 154(b) by 393 days.

This patent is subject to a terminal disclaimer.

(21) Appl. No.: 12/037,215

(22) Filed: Feb. 26, 2008

(65) Prior Publication Data

US 2008/0144556 A1    Jun. 19, 2008

Related U.S. Application Data

(63) Continuation of application No. 09/806,947, filed on May 25, 2001, now Pat. No. 7,359,403, which is a continuation of application No. PCT/FI99/00821, filed on Oct. 5, 1999.

(30) Foreign Application Priority Data

Oct. 6, 1998    (FI) ...................................... 982167

(51) Int. Cl.
    *H04J 3/16*    (2006.01)
(52) U.S. Cl. ........................ 370/469; 370/392; 370/476
(58) Field of Classification Search ................ 370/389, 370/392, 394, 395.1, 395.6, 465–466, 469, 370/470–474, 476
See application file for complete search history.

(56) References Cited

U.S. PATENT DOCUMENTS

| 4,956,839 A | 9/1990 | Torii |
| 5,206,858 A | 4/1993 | Nakano et al. |
| 5,214,639 A | 5/1993 | Herion |
| 5,280,476 A | 1/1994 | Kojima et al. |
| 5,333,135 A | 7/1994 | Wendorf |
| 5,394,398 A | 2/1995 | Rau |
| 5,414,702 A | 5/1995 | Kudoh |
| 5,570,362 A | 10/1996 | Nishimura |
| 5,583,859 A | 12/1996 | Feldmeier |

(Continued)

FOREIGN PATENT DOCUMENTS

EP    0786919 A1    7/1997

(Continued)

OTHER PUBLICATIONS

Brill, "The user-orientated layers in the SIO/OSI-model," Elektronik, vol. 37, No. 5, Mar. 4, 1988, pp. 77-78, 70-82.

(Continued)

*Primary Examiner*—Chi H. Pham
*Assistant Examiner*—Kevin Mew
(74) *Attorney, Agent, or Firm*—Harrington & Smith

(57) ABSTRACT

In a telecommunications system a larger higher layer data unit is segmented into smaller segments on the lower layer. A segmentation length information is used to indicate the lengths of the segments in a lower layer protocol data unit. Specific values of segmentation length information are employed to indicate, when necessary, special information about the upper layer data unit, such as whether the upper layer data unit ends in the current data segment in the lower layer protocol data unit or continues to the next lower layer protocol data unit. This information is needed in the receiver to correctly assemble the segmented data.

22 Claims, 2 Drawing Sheets

U.S. PATENT DOCUMENTS

| | | | |
|---|---|---|---|
| 5,640,399 A | 6/1997 | Rostoker et al. | |
| 5,699,369 A | 12/1997 | Guha | |
| 5,701,300 A | 12/1997 | Jeon et al. | |
| 5,737,332 A | 4/1998 | Corrigan et al. | |
| 5,917,828 A | 6/1999 | Thompson | |
| 5,930,265 A | 7/1999 | Duault et al. | |
| 5,974,458 A | 10/1999 | Abe et al. | |
| 6,061,820 A | 5/2000 | Nakakita et al. | |
| 6,333,932 B1 | 12/2001 | Kobayasi et al. | |
| 6,532,211 B1* | 3/2003 | Rathonyi et al. | 370/230 |
| 6,857,095 B2* | 2/2005 | Suumaki et al. | 714/748 |
| 6,895,544 B1* | 5/2005 | Park et al. | 714/776 |
| 6,961,349 B2* | 11/2005 | Malomsoky et al. | 370/469 |
| 7,154,873 B2* | 12/2006 | Yi | 370/338 |
| 7,254,143 B2* | 8/2007 | Jiang | 370/469 |
| 7,359,403 B1* | 4/2008 | Rinne | 370/469 |
| 2001/0007137 A1* | 7/2001 | Suumaki et al. | 714/18 |
| 2002/0174332 A1* | 11/2002 | Vialen et al. | 713/152 |

FOREIGN PATENT DOCUMENTS

| | | |
|---|---|---|
| EP | 0893037 B1 | 9/2006 |
| WO | 9738550 A1 | 10/1997 |

OTHER PUBLICATIONS

Protocols and Architecture, "The Layered Approach: The OSI Model," pp. 446-456.

* cited by examiner

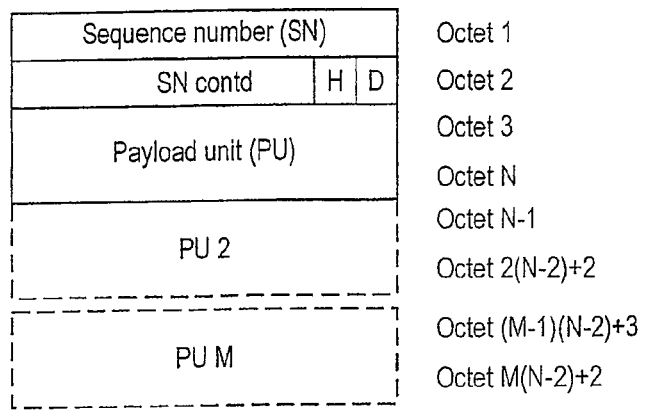
Fig. 3
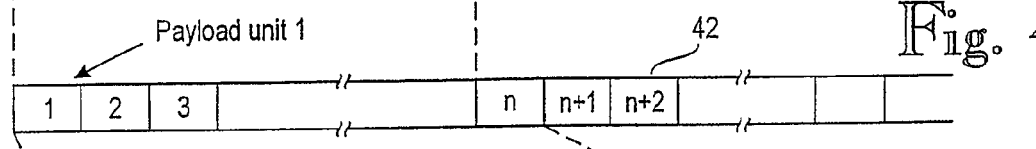
Fig. 4A
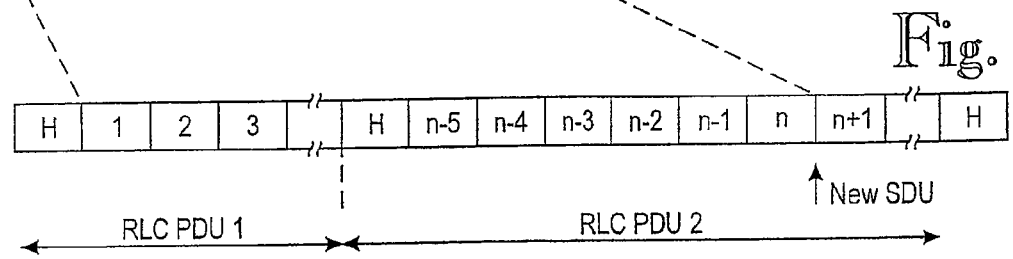
Fig. 4B
Fig. 4C
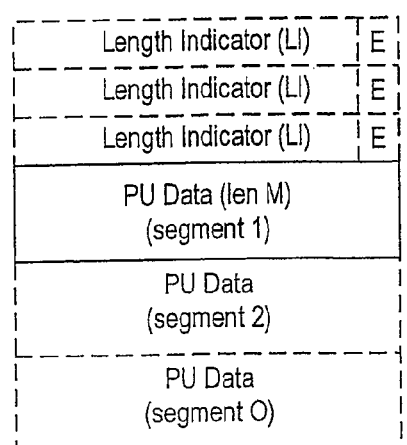
Fig. 5

DATA SEGMENTATION METHOD IN A TELECOMMUNICATIONS SYSTEM

CROSS-RELATED APPLICATIONS

This application is a continuation of U.S. patent application Ser. No. 09/806,947, filed Apr. 6, 2001, which is the U.S. National Phase of International Application PCT/FI99/00821, filed Oct. 5, 1999, which, in turn, relies for priority upon Finnish Application No. 982167, filed Oct. 6, 1998, the contents of all of which are incorporated herein by reference in their entireties.

FIELD OF THE INVENTION

The invention relates to data segmentation in a data transmission or signalling in telecommunications systems, and particularly in wireless telecommunications systems.

BACKGROUND OF THE INVENTION

Wireless communications system refers generally to any telecommunications system which enable a wireless communication between the users and the network. In mobile communications systems users are capable of moving within the service area of the system. A typical mobile communications system is a Public Land Mobile Network (PLMN).

At present third generation mobile systems, such as Universal Mobile Communication System (UMTS) and Future Public Land Mobile Telecommunication System (FPLMTS) later renamed as IMT-2000 (International Mobile Telecommunication 2000), are being developed. The UMTS is being standardized in ETSI (European Telecommunication Standards Institute) whereas ITU (International Telecommunication Union) is defining the IMT-2000 system. The radio interface is likely to be based on a wideband CDMA (code division multiple access), and therefore the third generation systems are often referred to as Wideband CDMA systems (WCDMA). These future systems are basically very much alike.

FIG. 1 shows a simplified UMTS architecture with the external reference points and interfaces to the UMTS Terrestrial Radio Access Network, UTRAN. The UTRAN consists of a set of Radio Access Networks RAN (also called Radio Network Subsystem RNS) connected to the Core Network CN through the interface Iu. These Radio Network Subsystems can be interconnected through the interconnection point (reference point) Iur. The interfaces Iu(s) and Iur are logical interfaces. Iur can be conveyed over physical direct connection between RANs or via any suitable transport network. Each RAN is responsible for the resources of its set of cells. For each connection between a mobile station MS and the UTRAN, one RAN is the Serving RAN. A RAN consists of a Radio Network Controller RNC and a multiplicity of base stations BS. The RNC is responsible for the handover decisions that require signalling to the MS. The base stations are connected to the RNC through the Iub interface. The core network CN is a conventional or future telecommunication network modified to efficiently utilize the UTRAN in a wireless communication. Telecommunication networks that are thought to be suitable core networks are second generation mobile communication systems (PSTN), such as GSM, ISDN (Integrated Services Digital Network), B-ISDN (Broadband ISDN), PDN (Packet Data Network), ATM etc.

FIG. 2 gives an overview of the assumed protocol environment in the third generation systems. Categorically, we can find three layers of the ISO/OSI layer model (International Standards Organisation/Open Systems Interconnection): physical layer (Layer 1, L1), data link layer (Layer 2, L2), and network layer (Layer 3, L3). In FIG. 2 the Layer L3 includes Radio Resources Control (RRC) protocol and upper user plane protocols. RRC takes care of all radio resources management. It negotiates quality of service QoS for a bearer service and on the basis thereof chooses needed transport format(s), (bitrates, type of coding, physical layer multiplexing), performs allocations (codes etc.), allocates identifiers for MS:s and bearer services, signals all of these parameters to MS, and supervises all handovers. User plane protocols relate to any upper layer transmission and signalling protocols. As used herein the term L3 protocols may also include the Link Access Protocol LAC set up between the MS and the core network CN although LAC may also be said to be an L2 protocol. LAN provides a peer-to-peer transportation of user data.

Layer L2 functions include the Radio Link Control (RLC) protocol and the Medium Access Control MAC. The RLC provides a radio-solution-dependent reliable link over the radio path. It takes care of segmentation and assembly of the Layer 3 data before and after transmission over the radio path, respectively, as well as retransmissions. Under the RLC the MAC function controls the mapping of the RLC protocol data units (RLC PDUs) into physical channels in the physical layer. The physical layer includes all the schemes and mechanisms used to make communications possible on the radio channel. These mechanisms include, for example, modulation, power control, coding and timing.

The RLC is capable of segmenting the higher layer PDUs. The segmenting allows a larger higher layer (e.g. L3, LAC) data unit to be split into smaller units (segments) on the lower layer (RLC). When segmenting is used, the transmitting end should indicate to the receiving end whether the same higher layer unit will continue in the next lower layer unit or a new higher level unit one will be started in the next lower layer unit. This information is needed in the receiver (either the mobile station (MS) or the network (NW)) to correctly assemble the segmented data.

In a prior art approach, a separate indicator has been used in each lower layer data segment to specify, whether the higher layer unit starts, ends or continues in the present data segment. Possible values may be the following, for example: 11 start & end; 10 start & continue; 00 continue; and 01 continue to end. The disadvantage of the prior art approach is that this extra field uses extra space in the protocol signalling and thereby causes extra overhead.

DISCLOSURE OF THE INVENTION

An object of the present invention is a segmentation method in which the overhead and other loss of performance caused by the segmentation information is minimized.

A first aspect of the invention is a data segmentation method in a telecommunications system, comprising the steps of segmenting larger data units of a higher layer into smaller protocol data units (PDU) of a lower layer so that each lower layer PDU comprises one or more data segments each containing data from a different one of the upper layer data units, providing the lower layer protocol data units containing two or more data segments, with a segmentation length information which indicates the length of the data segments, indicating with predetermined values of the segmentation length information special information about the higher level PDU, transmitting the lower level PDUs to a receiving end, assembling the segmented higher level data unit at the receiving end by means of the segmentation length information.

A second aspect of the invention is a telecommunications system, comprising an upper protocol layer comprising data units, a lower protocol layer comprising protocol data units having a payload size smaller than said upper layer data units, means segmenting said upper layer data units for insertion into smaller protocol data units of a lower layer so that each lower layer PDU comprises one or more data segments each containing data from a different one of the upper layer data units, means for inserting a segmentation length information which indicates the length of the data segments at least in the lower layer PDUs containing two or more data segments, means for giving a predetermined value in the segmentation length information in order to provide a receiver with special information about the higher level data unit, means for assembling the segmented higher level data unit from received lower layer PDUs at the receiver by means of the segmentation length information in said PDUs.

In the present invention specific values of segmentation length information are employed to indicate, when necessary, special information about the upper layer data unit, such as whether the upper layer data unit ends in the current data segment in the lower layer PDU or continues to the next lower layer PDU. Thus, a separate indicator field used in the prior art is avoided.

BRIEF DESCRIPTION OF THE DRAWINGS

In the following the invention will be described in greater detail by means of the preferred embodiments with reference to the accompanying drawings, in which FIG. 3 illustrates the structure of the RLC protocol data unit (PDU), FIGS. 4A, 4B and 4C illustrate the splitting of the upper layer service data unit (SDU) into payload units (PU) and the packing of the PUs in the RLC PDUs, and FIG. 5 illustrates a PU format with segmentation length indicators.

PREFERRED EMBODIMENTS OF THE INVENTION

The preferred embodiments of the invention are in the following described as implemented in the UMTS system. The invention is applicable to be used in any telecommunication system requiring segmentation of larger upper protocol layer data units into smaller units on a lower protocol layer.

As used herein the term segmentation means splitting a larger data unit of the higher layer (e.g. L3, LAC) into smaller units (segments) which can be accommodated by the lower layer (RLC) protocol data units (PDU). As a consequence, a data field of a lower layer PDU may contain one segment of an higher layer data unit, or two or more segments each containing data from a different one of the upper layer data units or padding. Segmentation information in a lower layer PDU is needed when the current upper layer data unit ends and a new upper layer data unit starts or padding is needed in the lower level PDU. The segmentation information is information included in the lower layer protocol unit in order to indicate to the receiving end how this segmentation, if any, in the PDU is done.

Figure 1:
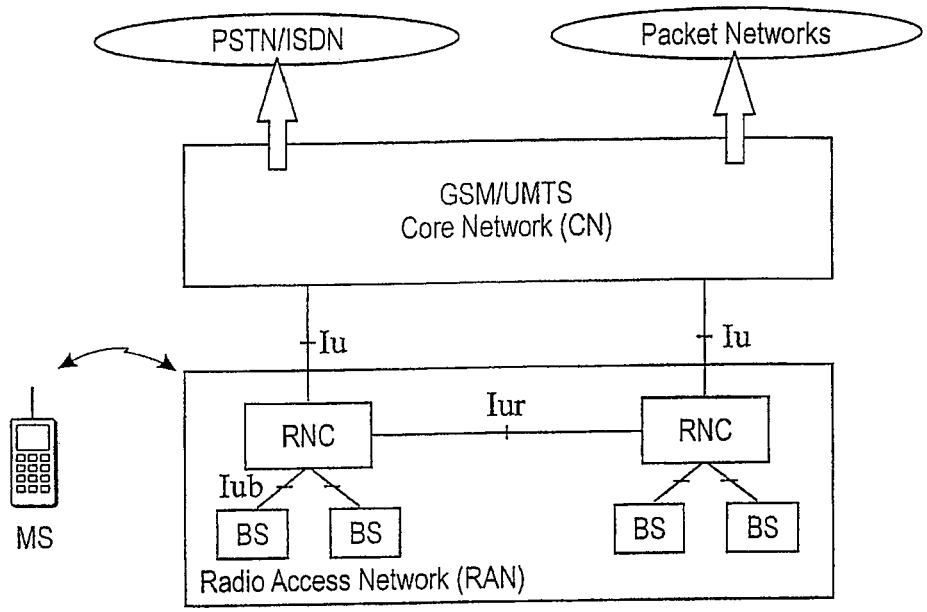
FIG. 1 shows a simplified UMTS architecture.
Figure 2:
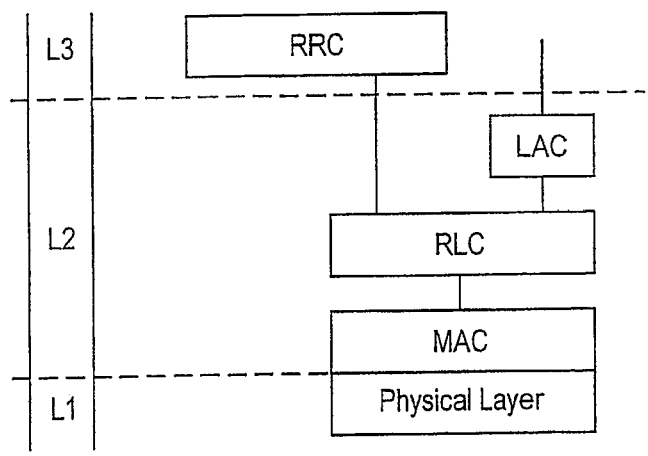
FIG. 2 illustrates an example of the protocol structure which may be used in the UMTS system.

Examples of the architecture and the simplified protocol structure of a UMTS access network were described above with reference to FIGS. 1 and 2, respectively.

The RLC can operate in assured, unassured and transparent modes. In the transparent mode no overhead is added to the data and no upper layer segmentation is maintained. In the assured and unassured modes segmentation and assembly of the upper layer PDUs is maintained. In the assured mode selective retransmission ARQ is also utilized to correct errors.

In the assured mode the RLC PDU has a control header and a data part consisting of one or more payload units (PU), as shown in FIG. 3. The PU is the smallest unit of a retransmission protocol used between the transmitting end and the receiving end for error correction. The retransmission is based on an acknowledgement of PUs and/or sending retransmission requests for missing or distorted PUs by the receiving end. The size of the PU is constant, radio bearer specific, and it is determined in the L3 bearer setup negotiation. The size of the PU can be changed only through an L3 bearer reconfiguration. Several PUs are utilized for high data rates if also low data rates need to be served or if a tight raster of bit rates is required.

The normal control header includes a 14-bit sequence number (SN) of the first payload unit in the PDU and two 1-bit extension flags, E and D. If the extension flag E is set, an extended header is used, i.e. the next two octets contain a new sequence number SN with a new extension flags E and D. The second extension flag D is used to indicate that the PU referenced by the respective sequence number start with segmentation information. The SN field indicates the sequence number of a payload unit PU in the RLC PDU. In normal assured-mode RLC PDU header it is the sequence number of the first PU in the PDU. If the PUs are not in sequence, a sequence number may be indicated separately for each PU by using the extended header. Also if some other than the first PU contains the segmentation information, the sequence number of the respective PU(s) is indicated separately by using the extended header.

If only the first PU in the RLC PDU contains the segmentation information the extension flag D in octet 2 of the PDU header is set (the first SN refers to the first PU). If several PUs contain the segmentation information in the PDU, each such PU is indicated in the PDU header by means of the respective PU sequence number with the D flag set. If no PU in the RLC PDU contains the segmentation information, no D flag is set in the PDU header.

FIGS. 4A and 4B illustrate how the upper layer (e.g. L3, LAC) data unit 41, called service data unit SDU herein, is split into smaller units 42, i.e. payload units PU. The border between two consecutive SDUs may be aligned with a border between two consecutive PUs, as shown in FIG. 4B, or it may occur in the middle of PU. The PUs 42 are then packed into RLC PDUs, as illustrated in FIG. 4C. In accordance with the terminology used herein, RLC PDU1 in FIG. 4C contains only one data segment, i.e. each of the n PUs contain data only from one upper layer data unit, namely SDU1. However, the RLC PDU2 in FIG. 4C contains two data segments, i.e. PUs n–5 . . . n contain data from the SDU1 and thereby provides the first data segment, whereas PUs from n+1 forwards contain data from the SDU2 and thereby provides the second data segment.

The segmentation information is provided by a variable number of length indicators that are included in at least one PU when needed. Length indicator is a (e.g. 7-bit) value the primary purpose of which is to indicate the length of the data segment in terms of octets (8 bits). However, all PUs in an RLC-U PDU do not need to have segmentation fields. The length indicator, for example 7-bit field, is assumed to be able to address all segments across the whole RLC PDU and therefore length indicators are normally included only in the first PU of an RLC PDU. This due to the fact that the maximum size of an RLC-U PDU data segment (approx. 40 octets) is expected to be much less than the maximum number addressable by the length indicator (128 octets). Also, it is mandatory that the length of the PDU and PU are known to both the transmitter and the receiver. The PU length is known from L3 service parameters and the RLC PDU length is recognized by receiving Layer 1 entity.

FIG. 5 illustrates a PU format with N length indicators in the first PU. The total number of segments is O, each being M octets in length. The flag E in the length indicator indicates whether there is another length indicator in the following octet (flag E=1) or not (flag E=0).

In the most simple case, where the PU contains data only from one SDU, and no segmentation information is needed in the PU. In other words, a PU without any segmentation information means that the PU is contiguous, comes from one SDU and the same SDU continues until the next PU which contains a segmentation information. No separate indicator for indicating whether the SDU continues or not is needed. If all PUs in the RLC PDU contains data from the same SDU, no segmentation information is needed in the PDU. Alternatively, the first PU in the PDU may be provided with a length indicator having a predefined value which indicates that the SDU in this PDU continues in the next RLC PDU. Such a value may be 1111110, for example. If the SDU ends at end of the current PDU, this indicated by a length indicator value which points exactly to the end of the PDU.

In the second situation the current SDU does not fill the PU completely and data from the next SDU is inserted into the remaining space in the PU. The first PU is provided with a length indicator giving the number of octets which contain data from the current SDU, i.e. the length indicator indirectly points the octet where the current segment and SDU ends. The flag E associated with the first length indicator is also set 1 to indicate that there is another length indicator. If the new SDU continues to the next PDU, a specific value, such as 11111110, is used for the second length indicator to indicate this. If the new SDU ends at end of the current PDU, this indicated by a length indicator value which points exactly to the end of the PDU.

In the third case the current SDU ends in the PDU and, since there is not more SDUs in the transmitter buffer, the rest of the PDU or part of it contains padding (fill bits). Again, the first PU is provided with a length indicator giving the number of octets which contain data from the current SDU, i.e. the length indicator indirectly points the octet where the current SDU ends. The flag E associated with the first length indicator is also set 1 to indicate that there is another length indicator. The second length indicator is provided with a specific value, such as 1111111, to indicate that there is padding until the next length indicator occurs (in the same or next PDU).

By using and interpreting some specific values of the length indicator according to the above rules, for example, no separate indicator for noting whether the SDU continues or not is needed.

An alternative way for the use of specific values of the length indicator for noting continuation or end of the SDU, might be to use one bit in the length indicator for that purpose. This approach would have a disadvantage, however. When a segmentation length indicator is used, the length of the longest possible data segment depends greatly on the number of bits that can be accommodated in one length indicator. From implementation point of view, it is desirable to maintain octet alignment, and therefore the size of the length indicator is limited by the number of extra information that needs to be accommodated in the same octet. With 7 bits, a segment of 128 octets can be addressed, as noted. If one bit is stolen to the end-indication purposes, only 64 octets can be addressed with the remaining 6 bits. By using specific values of the length indicator as described above also this disadvantage will be avoided.

The application has above been described by means of the preferred embodiments to illustrate the principles of the invention. Regarding the details the invention may vary within the scope and spirit of the accompanying claims.

The invention claimed is:

1. A method, comprising:
    segmenting larger data units of a higher layer into smaller protocol data units of a lower layer to be transmitted so that at least one of the lower layer protocol data units includes two or more data segments each containing data from two or more different higher layer data units; and
    indicating with predetermined values of a segmentation length information, special information about the higher layer data units, instead of the length of the segments that would be indicated by other values of the segmentation length information, in a lower layer protocol data unit that contains two or more data segments from two or more different higher layer data units.

2. The method of claim 1, wherein the special information includes indication whether the higher layer data unit ends in a current data segment or continues to a next lower level protocol data unit.

3. The method of claim 1, further comprising indicating with a predetermined value of the segmentation length information that the rest of the lower level protocol data unit contains padding until a next segmentation length information or a next lower level protocol data unit contains padding.

4. The method of claim 1, further comprising indicating, with a predetermined value of the segmentation length information, an exact point in the end of the lower layer protocol data unit that the higher layer data unit ends.

5. The method of claim 1, further comprising indicating with a predetermined value of the segmentation length information that the higher layer data unit carried in a current data segment continues to a next lower level protocol data unit.

6. A method, comprising:
    receiving smaller protocol data units of a lower protocol layer that contain data segmented from larger data units of a higher layer so that at least one of the lower layer protocol data units includes two or more data segments each containing data from two or more different higher layer data units;
    extracting segmentation length information from at least each lower layer protocol data unit that contains two or more data segments from two or more different higher layer data units, predetermined values of the segmentation length information indicating special information about the higher layer data units, instead of the length of the segments that would be indicated by other values of the segmentation information; and
    reassembling the higher layer data units from the data segments received in the lower layer data units of a lower protocol layer by means of the segmentation length information.

7. The method of claim 6, wherein the special information includes indication whether the higher layer data unit ends in a current data segment or continues to a next lower level protocol data unit.

8. The method of claim 6, further comprising indicating with a predetermined value of the segmentation length information that the rest of the lower level protocol data unit contains padding until a next segmentation length information or a next lower level protocol data unit contains padding.

9. The method of claim 6, further comprising indicating, with a predetermined value of the segmentation length information, an exact point in the end of the lower layer protocol data unit that the higher layer data unit ends.

10. The method of claim 6, further comprising indicating with a predetermined value of the segmentation length information that the higher layer data unit carried in a current data segment continues to a next lower level protocol data unit.

11. An apparatus, comprising:
a processor configured to segment larger data units of a higher layer into smaller protocol data units of a lower layer to be transmitted to a receiving end so that at least one of the lower layer protocol data units includes two or more data segments each containing data from two or more different higher layer data units; and
the processor being further configured to indicate with predetermined values of a segmentation length information, special information about the higher layer data units, instead of the length of the segments that would be indicated by other values of the segmentation length information, in a lower layer protocol data unit that contains two or more data segments from two or more different higher layer data units.

12. The apparatus of claim 11, wherein the special information includes indication whether the higher layer data unit ends in a current data segment or continues to a next lower level protocol data unit.

13. The apparatus of claim 11, wherein the special information includes indication that the rest of the lower level protocol data unit contains padding until a next segmentation length information or a next lower level protocol data unit contains padding.

14. The apparatus of claim 11, wherein the special information includes indication of an exact point in the end of the lower layer protocol data unit that the higher layer data unit ends.

15. The apparatus of claim 11, wherein the special information includes indication that the higher layer data unit carried in a current data segment continues to a next lower level protocol data unit.

16. An apparatus, comprising:
a processor configured to reassemble higher layer data units from the data segments received in lower layer data units of a lower protocol layer that contain data segmented from larger data units of a higher layer so that at least one of the lower layer protocol data units includes two or more data segments each containing data from two or more different higher layer data units; and
the processor being further configured to extract segmentation length information from at least one lower layer protocol data unit that contains two or more data segments from two or more different higher layer data units, predetermined values of the segmentation length information indicating special information about the higher layer data units, instead of the length of the segments that would be indicated by other values of the segmentation information.

17. The apparatus of claim 16, wherein the special information includes indication whether the higher layer data unit ends in a current data segment or continues to a next lower level protocol data unit.

18. The apparatus of claim 16, wherein the special information includes indication that the rest of the lower level protocol data unit contains padding until a next segmentation length information or a next lower level protocol data unit contains padding.

19. The apparatus of claim 16, wherein the special information includes indication of an exact point in the end of the lower layer protocol data unit that the higher layer data unit ends.

20. The apparatus of claim 16, wherein the special information includes indication that the higher layer data unit carried in a current data segment continues to a next lower level protocol data unit.

21. An apparatus, comprising:
means for segmenting larger data units of a higher layer into smaller protocol data units of a lower layer to be transmitted so that at least one of the lower layer protocol data units includes two or more data segments each containing data from two or more different higher layer data units; and
means for indicating with predetermined values of a segmentation length information, special information about the higher layer data units, instead of the length of the segments that would be indicated by other values of the segmentation length information, in a lower layer protocol data unit that contains two or more data segments from two or more different higher layer data units.

22. An apparatus, comprising:
means for reassembling higher layer data units from the data segments received in lower layer data units of a lower protocol layer that contain data segmented from larger data units of a higher layer so that at least one of the lower layer protocol data units includes two or more data segments each containing data from two or more different higher layer data units; and
means for extracting segmentation length information from at least one lower layer protocol data unit that contains two or more data segments from two or more different higher layer data units, predetermined values of the segmentation length information indicating special information about the higher layer data units, instead of the length of the segments that would be indicated by other values of the segmentation information.

* * * * *